INVENTORS
IRVIN E. McWETHY
JOSEPH F. OLES
BY
ATTORNEY

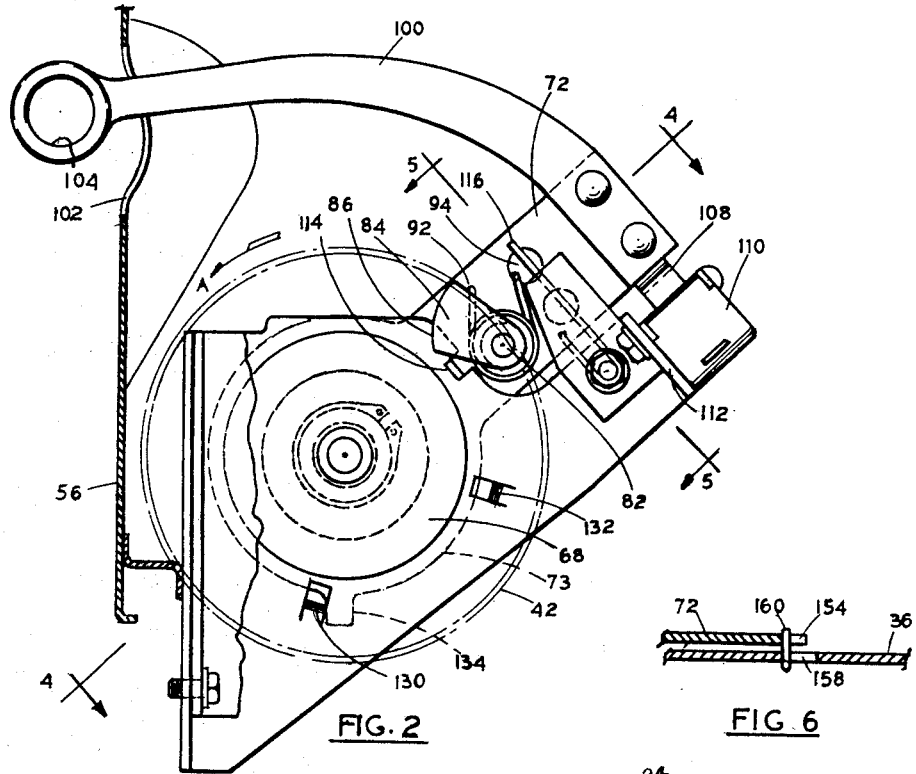
FIG. 2
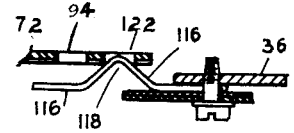
FIG. 6
FIG. 5
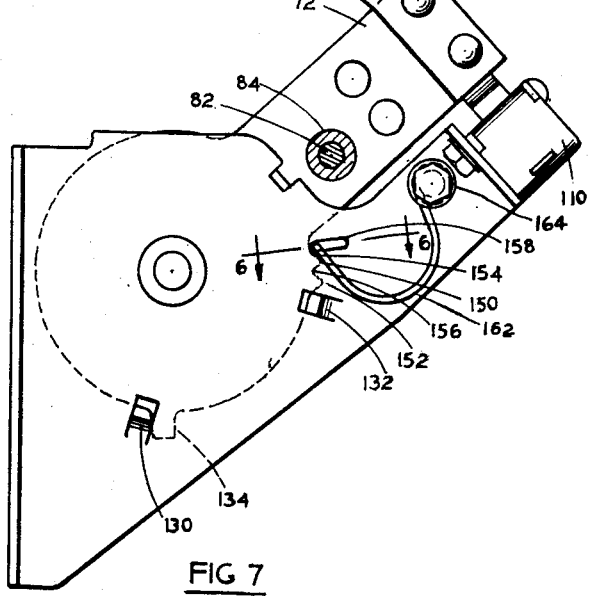
FIG. 7
INVENTORS
IRVIN E. McWETHY
JOSEPH F. OLES
BY
ATTORNEY July 28, 1964   I. E. McWETHY ETAL   3,142,731
SEQUENTIAL CONTROL MECHANISM FOR LAUNDRY APPLIANCE
Filed April 4, 1962   3 Sheets-Sheet 3

United States Patent Office 3,142,731
Patented July 28, 1964

3,142,731
SEQUENTIAL CONTROL MECHANISM FOR LAUNDRY APPLIANCE
Irvin E. McWethy, Syracuse, and Joseph F. Oles, Camillus, N.Y., assignors, by mesne assignments, to Hupp Corporation, Cleveland, Ohio, a corporation of Virginia
Filed Apr. 4, 1962, Ser. No. 185,109
10 Claims. (Cl. 200—38)

This invention relates to laundry appliance controls, and more particularly to timer controlled automatic appliances such as clothes driers and washing machines.

In automatic laundry appliances of the type referred to, it has been the practice to control the sequence of operation by a timer having cams that are advanced stepwise, such as shown in Hall Patents, 2,227,133 and 2,313,064, issued December 31, 1940, and March 9 1943, respectively. Such timers are driven by a synchronous motor through a step by step movement and a one way clutch, to permit the operator to advance the cams to vary the length of time allowed for a particular portion of the complete cycle. Such timers have also been provided with a master switch which is moved from an open to closed position by manual axial shift of the cam shaft, as for example shown in Etherington 2,890,580. It has been the practice to instruct operators, before advancing the cams to axially shift the shaft to temporarily open the master switch, and thereby cut off the power during manual advance of the cam shaft. Many operators fail to take this precaution. In control circuits, where the reversal of the main drive motor is required to perform the sequence of operations, failure to take such precaution, may advance the cycle instantaneously from one position to the next, which may call for motor reversal, but without providing any appreciable time for the motor to reverse, thus disrupting the normal cycle, since the motor continues without reversing.

The present invention is directed to a timer control and novel indicator which may be advanced manually at will, wherein provision is made for assuring the opening of the main switch before any advance may be manually effected. Thus the drive motor is stopped whenever manual advance is effected, and will have an opportunity to restart in the proper direction, when the operator has completed the cam advancing operation.

The invention further has to do with a drum type helical indicator coupled to the timer that permits an operator to readily see the stage of operation, or the degree of manual advance being effected.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 2 is a transverse sectional view taken approximately on the line 2—2 of FIGURE 1, with the timer removed;

FIGURE 5 is a fragmentary sectional view taken on the line 5—5 of FIGURE 2;

FIGURE 6 is a fragmentary sectional view taken on line 6—6 of FIGURE 7 of a modified form of detent, and FIGURE 7 is a fragmentary sectional view of a portion of the appliance control showing the manner in which the modified detent of FIGURE 6 is mounted on the control.

Figure 1:
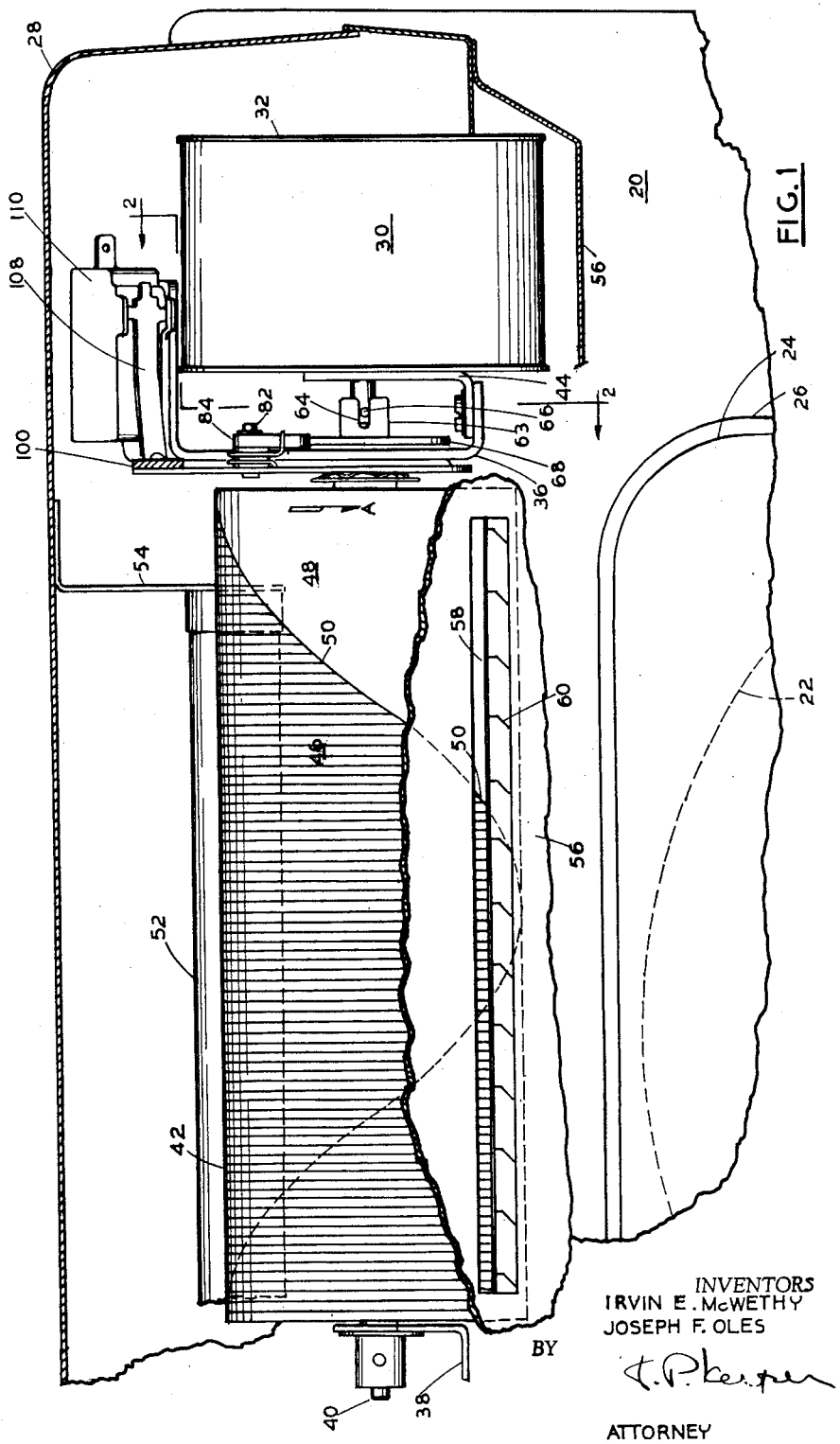
FIGURE 1 is a fragmentary top plan view with parts broken away of the appliance control.

Referring to the drawing, in FIGURE 1, there is shown the top deck 20 of a typical appliance such as a vertical axis washing machine wherein is employed a vertical axis agitator, within a centrifugal extractor tub, usually located within a surrounding splash tub. The circular access opening to the extractor tube is indicated at 22, and access thereto is by a hinged lid, indicated at 24, nesting in a top deck opening surrounded by an offset flanged recess 26. To the rear of the deck, behind the access opening is an upstanding control housing 28 extending lengthwise of the rear of the deck, and within which is mounted a timer 30 driven by a synchronous electric motor of the general type indicated in the aforesaid Hall patents. Such timer contains cam activated switches within the housing 32, and has a cam shaft, one end of which projects from the housing as at 34. The cam shaft is driven from a synchronous electric motor through a one way clutch that permits manual advance of the cam shaft, and provision is made to prevent backward rotation of the cam shaft, all as is well understood in the art.

The housing 28 comprises support brackets 36 and 38, which extend to the deck and in which is journalled a drum shaft 40 having affixed thereon a hollow cylindrical indicator drum 42, which may be formed of a translucent plastic.

The bracket 36 may support the timer 20 through a bracket 44, with the timer shaft 34 in alignment with the drum shaft 40. The drum 42 has a colored area 46 and a contrasting white area 48, separated along a helical indicator line 50. The drum may be illuminated from behind and below from a fluorescent lamp 52 mounted on brackets, one of which is shown at 54. A front panel 56, with an elongated slot 58, and indicating scale 60 is positioned in front of and somewhat up from the center line of the drum, at a suitable angle as indicated in FIGURE 2, so that an operator can observe the indicator line 50 through the slot, and read upon the indicia scale 60, the angular position of the drum and the stage of the wash cycle.

The drum shaft 40 has a sleeve 62 to which is affixed an arm 63 having a slot 64 to receive a pin 66 on the timer shaft so that the drum shaft is driven by the timer shaft 34. The connection is such as to transmit torque only and relieve the timer shaft and indicator shaft from alignment problems which might result in binding. Also fixed upon the shaft 40 adjacent the sleeve 62 is a circular friction wheel 68, by means of which the drum 46, and the timer may be advanced from time to time as is desired by the operator, in the direction of arrow A, which is the same direction of drive by the timer shaft 34.

Figure 3:
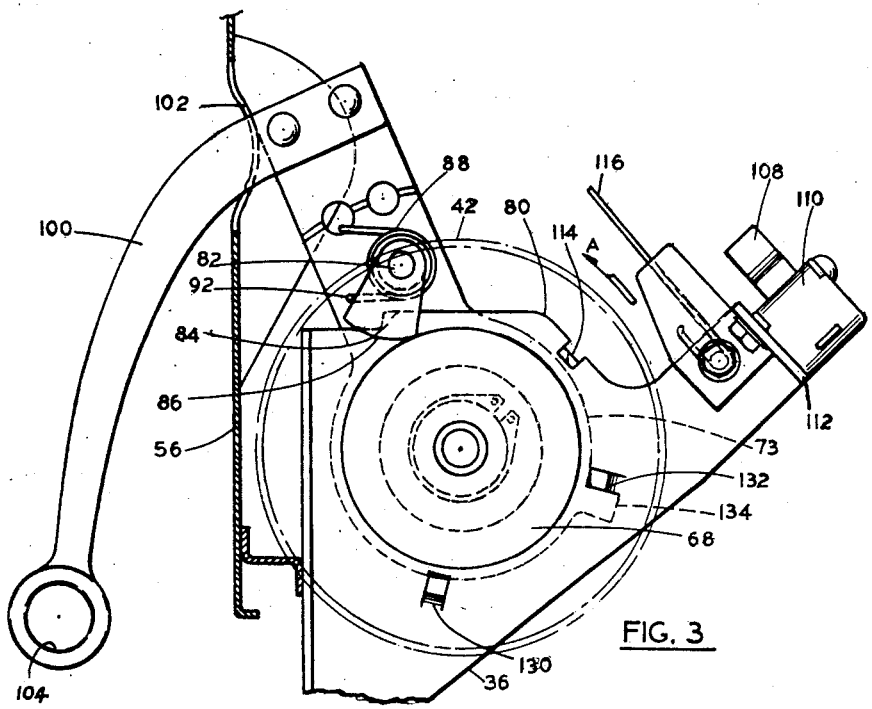
FIGURE 3 is a transverse sectional view like FIGURE 2, but showing manual advancement of the indicator.
Figure 4:
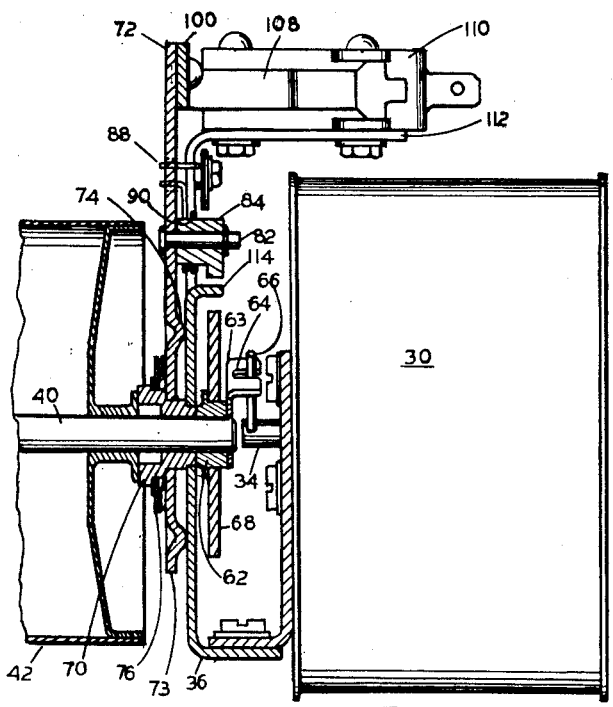
FIGURE 4 is a fragmentary sectional view taken on the line 4—4 of FIGURE 2.

In FIGURE 4, it will be seen that the drum shaft 40 is journalled in a sleeve 70 affixed in the bracket 36. Pivotally mounted on the sleeve 70 is a rocker arm in the form of a plate 72. The central circular portion 73 of such arm is provided with dimples 74 frictionally bearing against the bracket 36, and is resiliently caused to bear against the bracket 36 by the annular dished spring washer 76 held against the shoulder 78 of the sleeve 70. The bracket 36 is cut away as shown at 80 to provide clearance for a stud 82, upon which is pivoted a friction shoe 84 adapted to engage the friction wheel. Such friction shoe 84 has a spiral cam or grip face 86, which upon rotation counterclockwise, is adapted to engage the periphery of the friction wheel 68, in the manner indicated in FIGURE 3. A coil spring 88 disposed about the hub 90 of the shoe 84, has an end 92 hooked around the shoe, and an end hooked in the aperture 94 of the plate 72, to constantly urge the shoe 84 to rotate yieldingly in a counterclockwise direction in reference to the arm 72. The surface 86 engages the wheel at a point substantially in the line of centers of the shaft 40 and the stud 82, and provides a one way clutch, acting on the toggle principle, due to the spiral cam face 86, to drive the wheel 68 counterclockwise, whenever the arm 72 is rotated counterclockwise about its pivot on the sleeve 70 as in FIGURE 3. Upon clockwise rotation of the arm 72, the shoe is caused to rock clockwise to release its grip upon the wheel, clockwise rotation of the wheel being prevented by its coupling with the timer, which is provided with means to prevent backward rotation.

The arm 72, has at its outer end an arcuate arm 100 which may project forwardly through a slot 102 in the front panel, and the free end of which is provided with a convenient finger ring or grip 104. The arm, by reason of the friction dimples 74 will remain in any position when not held manually. The arm 72 when rotated clockwise to the end of its arcuate travel abuts the trigger blade 108 of a mircoswitch 110 mounted upon a bracket extension 112 of the bracket 36. As the arm 72 is rotated clockwise toward the position shown in FIGURE 2, the cam shoe abuts a stop lug 114 struck from the bracket 36 and is caused to rock clear of the wheel 68, as in shown in FIGURE 2. A spring finger 116 (see FIGURE 5) mounted on the bracket 36 has a knee portion 118 adapted to yieldingly engage in recesses 94 or 122 of the arm 72, which as shown, are in the form of apertures. The recess 94 is adapted to hold the arm 72 at its upper most limit of travel where it engages the blade of the microswitch, and the switch is thereby closed. The recess 122 is adapted to hold the arm 72 at a short arcuate spacing from the limit of travel, so as not to engage the switch blade 108, and thereby leave the switch in open position. In this position the shoe 84 is preferably out of engagement with the wheel 68.

Suitable stops are provided to limit the arcuate movement of the arm 72 between suitable limits, the stops being struck from the bracket 36, as at 130 and 132, to engage a lug 134 on the arm 72.

In FIGURES 6 and 7, a variation in the detent is shown employed for holding the arm 72 either in switch closed position, or in a switch opened position prior to engagement of the cam shoe 84 and the wheel 68. As shown the periphery of the central circular portion 73 of the arm 72 is provided with two lobes 150 and 152 which form with the arm 72 valleys 154 and 156. The bracket 36 is provided with a radial guide slot 158, through which extends the inbent end 160 of the free end of an arcuate spring 162, the other end of such spring being anchored as at 164 to the bracket 36. The spring end 160 rides in the valleys 154 and 156 and over the lobes 150 and 152 provide a yielding means for holding the arm in switch closed position, or switch opened position. At the same time, the lever is manually shifted at will from either of such positions through an arc of cam advance, during which the shoe 84 engages the wheel 68 as previously described.

In the past, it has been the practice, as set forth to provide a master switch in the timer which opens all circuits to the operation of the appliance upon axial movement of the timer shaft to an off position. The mircoswitch is intended to take the place of such switch and operate as a master switch. Thus, it will be seen that upon any manual advancement of the timer, by counterclockwise rotation of the arm 72, the microswitch, which is a master switch, is first opened, before the shoe 84 can engage wheel 68, and thus all manual timer advance is made while the apparatus is temporarily disconnected from the line, and the main drive motor, and the timer motor deenergized. The control may be left in any position except the end position where the switch which is a single pole single throw normally open switch, is closed, and the machine is "off." While a timer with a one way advancing clutch has been referred to, a plain friction clutch drive between the timer motor and cam shaft can be employed, whereby the drum can be advanced, or set back, the latter being useful in a dryer, where the drum is angularly set back for a desired drying period, and returned by the timer movement.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A control mechanism for a laundry appliance comprising
   a motor driven timer having a shaft extending therefrom for controlling the sequence of operations in the operating cycle of said appliance,
   indicator means mounted on a support shaft operatively coupled with said timer shaft to indicate the stage of the cycle of said appliance,
   a control arm mounted for rotation about an axis substantially coaxial with said support shaft, said arm being rotatable from an end limit position through a timer advancing arc position,
   a friction drive wheel mounted on said support shaft adjacent said arm,
   a friction shoe pivotally mounted on said arm for engaging said wheel upon rotation of said arm to rotatably advance said timer shaft in one direction to advance the sequence of operations of said appliance,
   and switch means in circuit with said timer actuated to a closed position when said arm is in its end limit position to activate said appliance and to an opened position when said arm is disposed in said timer advancing arc position to deactivate said appliance.

2. A control mechanism for a laundry appliance as defined in claim 1 wherein said indicator means comprises an indicator drum having a helical indicator line thereon mounted on said support shaft.

3. A control mechanism for a laundry appliance as defined in claim 1 which includes abutment means for engaging and holding said friction shoe out of engagement with said wheel when said arm is in its end limit position.

4. A control mechanism for a laundry appliance as defined in claim 1 which includes detent means for releasably securing said arm in its end limit position.

5. A control mechanism for a laundry appliance as defined in claim 1 which includes stop means to limit the angular movement through which said arm may rotate.

6. A control mechanism for a laundry appliance comprising
   a motor driven timer having a shaft for controlling the sequence of operations in the operating cycle of said appliance,
   an indicator drum having a helical indicator line thereon mounted on a support shaft operatively coupled with said timer shaft to indicate the stage of the cycle of said appliance,
   a bracket for supporting one end of said support shaft,
   a control arm mounted for rotation on said bracket about an axis coaxial with said support shaft, said arm being rotatable from an end limit position through a timer advancing arc position,
   means to limit the angular movement through which said arm may rotate,
   a friction drive wheel mounted on said support shaft adjacent said arm,
   a spring biased friction shoe pivotally mounted on said arm and having a cam surface for engaging said wheel upon rotation of said arm to rotatably advance said timer shaft in said one direction to advance the sequence of operations of said appliance, switch means in circuit with said timer actuated to a closed position when said arm is in its end limit position to activate said appliance and to an opened position when said arm is disposed in said timer advancing arc position to deactivate said appliance, abutment means for holding said friction shoe out of engagement with said wheel when said arm is in its end limit position, and detent means for releasably securing said arm in its end limit position.

7. A control mechanism for a laundry appliance as defined in claim 6 which includes friction means for resisting rotation of said arm relative to said bracket.

8. A control mechanism for a laundry appliance as defined in claim 6 wherein said detent means comprises spring means mounted on said bracket for engaging a recess in said arm.

9. A control mechanism for a laundry appliance comprising a motor driven timer having a shaft extending therefrom for controlling the sequence of operations in the operating cycle of said appliance, a rotatably mounted control arm rotatable from an end limit position through a timer advancing arc position, clutch means interconnecting said arm and said shaft to rotatably advance said timer shaft in one direction when said arm is pivoted through said timer advancing arc position to advance the sequence of operations of said appliance, and switch means in circuit with said timer actuated to a closed position when said arm is in its end limit position to activate said appliance and to an opened position when said arm is disposed in said timer advancing arc position to deactivate said appliance.

10. A control mechanism for a laundry appliance as defined in claim 9 which includes indicator means mounted on a support shaft operatively coupled with said timer shaft to indicate the stage of the cycle of said appliance.

References Cited in the file of this patent
UNITED STATES PATENTS
2,971,143   Stillwell _____ Feb. 7, 1961